United States Patent
Sutcliffe et al.

(10) Patent No.: US 10,926,327 B2
(45) Date of Patent: Feb. 23, 2021

(54) ADDITIVE MANUFACTURING APPARATUS AND A FLOW DEVICE FOR USE WITH SUCH APPARATUS

(71) Applicant: RENISHAW PLC, Wotton-under-Edge (GB)

(72) Inventors: Christopher Sutcliffe, Liverpool (GB); Ceri Brown, Redland (GB)

(73) Assignee: RENISHAW PLC, Wotton-under-Edge (GB)

( * ) Notice: Subject to any disclaimer, the term of this patent is extended or adjusted under 35 U.S.C. 154(b) by 1045 days.

(21) Appl. No.: 15/318,115

(22) PCT Filed: Jun. 11, 2015

(86) PCT No.: PCT/GB2015/051718
§ 371 (c)(1),
(2) Date: Dec. 12, 2016

(87) PCT Pub. No.: WO2015/189619
PCT Pub. Date: Dec. 17, 2015

(65) Prior Publication Data
US 2017/0120330 A1  May 4, 2017

(30) Foreign Application Priority Data

Jun. 12, 2014 (GB) ..................... 1410484

(51) Int. Cl.
*B29C 67/00* (2017.01)
*B22F 3/105* (2006.01)
(Continued)

(52) U.S. Cl.
CPC .......... *B22F 3/1055* (2013.01); *B29C 64/268* (2017.08); *B29C 64/371* (2017.08);
(Continued)

(58) Field of Classification Search
None
See application file for complete search history.

(56) References Cited

U.S. PATENT DOCUMENTS 2,052,869 A  9/1936  Coanda
9,456,884 B2 10/2016  Uckelmann et al.
(Continued)

FOREIGN PATENT DOCUMENTS

CN  101321600 A  12/2008
CN  103071798 A  5/2013
(Continued)

OTHER PUBLICATIONS

Mar. 5, 2018 Office Action issued in Chinese Patent Application No. 201580042715.6.
(Continued)

*Primary Examiner* — Ryan M Ochylski
(74) *Attorney, Agent, or Firm* — Oliff PLC

(57) ABSTRACT

An additive manufacturing apparatus including a build chamber in which an object is built and a flow device. The flow device comprises a body having a Coandă surface and a passageway connectable to a pressurised gas source. The passageway has an opening located adjacent to the Coandă surface to, in use, direct a jet of gas over the Coandă surface. A space adjacent the Coandă surface is in fluid communication with the build chamber such that gas drawn into and/or propelled from the space causes gas flow through the build chamber.

7 Claims, 8 Drawing Sheets

(51) Int. Cl.
*B33Y 30/00* (2015.01)
*B29C 64/268* (2017.01)
*B29C 64/371* (2017.01)

(52) U.S. Cl.
CPC ....... *B33Y 30/00* (2014.12); *B22F 2003/1056* (2013.01); *B22F 2201/50* (2013.01); *Y02P 10/25* (2015.11)

(56) References Cited

U.S. PATENT DOCUMENTS

| | | | |
|---|---|---|---|
| 2005/0116391 A1 | 6/2005 | Lindemann et al. | |
| 2009/0060710 A1 | 3/2009 | Gammack et al. | |
| 2009/0266803 A1 | 10/2009 | Perret et al. | |
| 2010/0226801 A1 | 9/2010 | Gammack | |
| 2015/0190968 A1* | 7/2015 | Griszbacher | B33Y 10/00 264/40.6 |
| 2016/0136730 A1* | 5/2016 | McMurtry | G02B 26/101 425/162 |
| 2016/0136731 A1* | 5/2016 | McMurtry | B29C 64/153 419/53 |
| 2020/0061922 A1* | 2/2020 | Meiners | B29C 64/232 |

FOREIGN PATENT DOCUMENTS

| | | |
|---|---|---|
| CN | 103635305 A | 3/2014 |
| CN | 103737933 A | 4/2014 |
| CN | 102574333 B | 7/2015 |
| EP | 2492084 A1 | 8/2012 |
| JP | 2014-104489 A | 6/2014 |
| WO | 92/08592 A1 | 5/1992 |
| WO | 2010/007396 A1 | 1/2010 |
| WO | 2010/026396 A2 | 3/2010 |
| WO | 2012/045255 A1 | 4/2012 |
| WO | 2015/103458 A2 | 7/2015 |

OTHER PUBLICATIONS

Oct. 1, 2015 International Search Report issued in International Patent Application No. PCT/GB2015/051718.

Oct. 1, 2015 Written Opinion issued in International Patent Application No. PCT/GB2015/051718.

B. Ferrar et al. "Gas Flow Effects on Selective Laser Melting (SLM) Manufacturing Performance". Journal of Materials Processing Technology, vol. 212, No. 2, Sep. 26, 2011, pp. 355-364.

* cited by examiner

ADDITIVE MANUFACTURING APPARATUS AND A FLOW DEVICE FOR USE WITH SUCH APPARATUS

FIELD OF INVENTION

This invention concerns additive manufacturing apparatus and a flow device for use in such apparatus. The invention has particular, but not exclusive application, to apparatus for selective laser melting (SLM) and selective laser sintering (SLS).

BACKGROUND

Additive manufacturing or rapid prototyping methods for producing components comprise layer-by-layer consolidation of a material, such as a powder material, using a focussed laser beam or an electron beam. In SLM or SLS, a powder layer is deposited in a build chamber and a focussed laser beam is scanned across portions of a powder layer that correspond to a cross-section of the component being constructed such that the powder at the points where the laser scans is consolidated either by sintering or fusion. After consolidation of a layer, a build surface is lowered by a thickness of the newly consolidated layer and a further layer of powder is spread over the surface and consolidated as required. Typically, the laser or electron beam will enter in to the chamber through a window in the chamber.

During SLM/SLS of material, in particular metals, a significant amount of condensate can be produced in the build chamber. This condensate should be removed from the build chamber to prevent undesirable effects, such as the condensate settling on and being integrated into the component being built and/or the condensate blocking the window through which the laser or electron beam enters into the chamber. It is known to remove condensate from the build chamber by introducing a gas flow through the chamber in which the condensate is entrained, the condensate exiting the chamber along with the gas flow.

B. Ferrar, l. Mullen, E. Jones, R. Stamp. C. J. Sutcliffe, "Gas flow effects on selective laser melting (SLM) manufacturing performance", Journal of Materials Processing Technology, Volume 212, Pages 355 to 364, investigates the effect of gas flow on test pieces manufactured using SLM. It is identified that areas of low gas flow appear to coincide with test pieces of high porosity and low compressive strength and gas flow uniformity is an important process variable enabling the production of constructs that are consistent in their strength and density. The gas flow rail disclosed therein resulted in positional variation in porosity and strength, which was believed to result from frictional losses as gas travelled along a length of the gas rail.

SUMMARY OF THE INVENTION

According to a first aspect of the invention there is provided an additive manufacturing apparatus comprising a build chamber in which an object is built and a flow device, the flow device comprising a body having a Coandă surface and a passageway connectable to a pressurised gas source, the passageway having an opening located adjacent to the Coandă surface to, in use, direct a jet of gas over the Coandă surface, wherein a space adjacent the Coandă surface is in fluid communication with the build chamber such that gas drawn into and/or propelled from the space causes gas flow through the build chamber.

In use, the jet of gas (or so called "Coandă jet") directed over the Coandă surface is pulled towards and travels along the surface by virtue of the Coandă effect, which, in turn, generates suction that draws additional gas into the space adjacent the surface. Typically, the Coandă surface turns away from a direction of the jet. Use of such a device to generate gas flow through the chamber may improve the entrapment and transport of condensate from the build chamber relative to an air flow generated by blowing gas through the chamber. Such a device may generate a more uniform gas flow, reducing variation in properties of a build across the build chamber.

The body may define an aperture enclosing the Coandă surface, at least one side of the aperture opening into the build chamber. In one embodiment, the Coandă surface forms a substantial portion, if not the entire, internal surface of the body that defines the aperture. Such an aperture may help to increase the suction generated by movement of the jet along the Coandă surface and may generate a tube of gas with substantially laminar flow (sometimes described as a plug flow) through the chamber. Such a tube of gas may be better at entraining and carrying away condensate relative to the more turbulent flow generated by blowing gas through the build chamber.

The Coandă surface may comprise an upstream edge and a downstream edge in relation to the gas flow, the opening located towards the upstream edge. The opening may comprise a slit or multiple slits and the slit or multiple slits may extend around a substantial proportion of the aperture, for example, at least half of a circumference of the aperture.

A further opening of the or a further passageway may be arranged to direct a jet of gas over a further Coandă surface of the body and, in the case of a body that defines an aperture, an outwardly facing Coandă surface (one that does not define the aperture). The further Coandă surface may turn away from a direction of the jet generated by the further opening. In one embodiment, the body has a cross-section that tapers towards a narrow (downstream) end, such as in a teardrop shape, the Coandă surface located one side of the narrow end and the further Coandă surface located the other side of the narrow end. In this way, gas is drawn into spaces either side of the body by virtue of the Coandă effect, the flows converging about the narrow end of the body.

The passageway may be an interior passageway in the body. The body may define the opening and/or the further opening from the interior passageway, preferably located closer to a broader (upstream) end of the body than the narrow end.

The opening/further opening is narrow relative to the broader aperture defined by the body. In this way, the opening/further opening generates a jet of pressurised air, whereas the aperture has sufficient extent to draw in air from the surroundings.

The aperture may be an inlet or an outlet to the build chamber.

Alternatively, the body may be housed within the build chamber such that both sides of the aperture are open to the build chamber. In this way, gas is drawn into the aperture from the build chamber and also expelled into the build chamber from the other side of the aperture to generate a gas flow circulation through the build chamber. Appropriate positioning of the body in the build chamber will ensure that gas flow passes over a build platform to facilitate the removal of condensate from this volume.

The apparatus may comprise at least two flow devices, as described above, for generating gas flow within the build chamber. The flow devices may be positioned either side of a volume above a build platform, with one flow device arranged to propel gas into the volume and the other flow device arranged to draw gas from the volume. Such an arrangement may create a tube of laminar flow over the build platform, which may improve the entrapment and transport of condensate from the build chamber relative to a more turbulent gas flow generated by blowing gas through the chamber.

The apparatus may comprise a laser for generating a laser beam and an optical module for steering the laser beam through a window in the build chamber to consolidate material in the build chamber, wherein the Coandă surface of the flow device is located adjacent the window to cause gas flow within the build chamber across the window.

In this way, the flow device may prevent/reduce contamination of a surface of the window, for example by condensate generated by the additive manufacturing process. Condensate settling on the window can affect the laser beam passing therethrough, for example, by dispersing the laser beam and/or causing the laser beam to be redirected from a desired path.

The Coandă surface may be shaped to conform to a shape of the window. For example, the window may have a curved cross-sectional shape, such as a circular shape, and the Coandă surface may curve in a corresponding manner to follow the curved cross-sectional shape of the window. The Coandă surface may extend around at least 25%, and preferably at least 40%, of a circumference of the window.

The Coandă surface may be located such that gas in the volume below the window is drawn into the space adjacent the Coandă surface to cause gas flow across the window.

The apparatus may comprise a wiper movable across a material bed for spreading flowable material across the material bed, the Coandă surface arranged to move with the wiper. The apparatus may comprise inlet and outlet nozzles for generating gas flow across the material bed. The apparatus may be arranged to consolidate material of the material bed whilst spreading material with the wiper. The Coandă surface may be arranged to shape the gas flow across the wiper, for example to reduce turbulence. The Coandă surface may be aligned to draw and/or propel gas in a direction substantially parallel with the gas flow. The wiper may be arranged to spread powder through movement in a direction perpendicular to a gas flow direction or in a direction parallel with the gas flow direction.

According to another aspect of the invention there is provided a flow device for an additive manufacturing machine, the flow device comprising a body that tapers towards a narrow end, the body having an interior passageway connectable to a pressurised gas source, the interior passageway having openings, one opening arranged to direct the jet of gas over a Coandă surface of the body one side of the narrow end and another opening arranged to direct the jet of gas over a further Coandă surface of the body the other side of the narrow end.

The body of the flow device is made of material such that it is suitable to be used in the high temperature environment of a build chamber of an additive manufacturing machine.

According to another aspect of the invention there is provided a method of building an object using additive manufacturing, the method comprising generating a flow of gas across a build platform in a build chamber of an additive manufacturing machine using a flow device, the flow device comprising a body having a Coandă surface and a passageway connectable to a pressurised gas source, the passageway having an opening located adjacent to the Coandă surface to, in use, direct a jet of gas over the Coandă surface, wherein a space adjacent the Coandă surface is in fluid communication with the build chamber such that gas drawn into and/or propelled from the space causes gas flow through the build chamber.

This method of manufacture may result in an object having improved properties, such as lower porosity and/or higher compression strength.

According to a further aspect of the invention there is provided an additive manufacturing apparatus for manufacturing a three-dimensional object by layerwise consolidation of flowable material, the apparatus comprising a lowerable build platform for supporting a bed of the flowable material, an energy beam for selectively consolidating flowable material at a working surface of the bed to form the object, a wiper for spreading flowable material across the bed, the wiper movable during consolidation of the flowable material with the energy beam, and an active flow device for influencing a gas flow that traverses the wiper, the active flow device movable with the wiper.

The active flow device may be arranged to reduce turbulence in the gas flow.

The apparatus may comprise a gas inlet and gas outlet in the build chamber for generating a gas flow across the working surface, the gas flow traversing the wiper as the wiper moves to spread powder during consolidation of the flowable material, the active flow device influencing the gas flow in the vicinity of the wiper.

The active gas flow device may comprise at least one opening therein for sucking gas from the build chamber.

The active gas flow device may comprise at least one opening therein for propelling gas into the build chamber. The opening may generate a jet of gas along a surface of the active flow device. The surface may be a Coandă surface. The surface may be a surface that extends parallel to a direction of the jet. Generating a high velocity gas flow along surfaces of the flow device/wiper may reduce turbulence generated from the gas flow intersecting the wiper as the wiper moves across the working surface.

DESCRIPTION OF EMBODIMENTS

Figure 1:
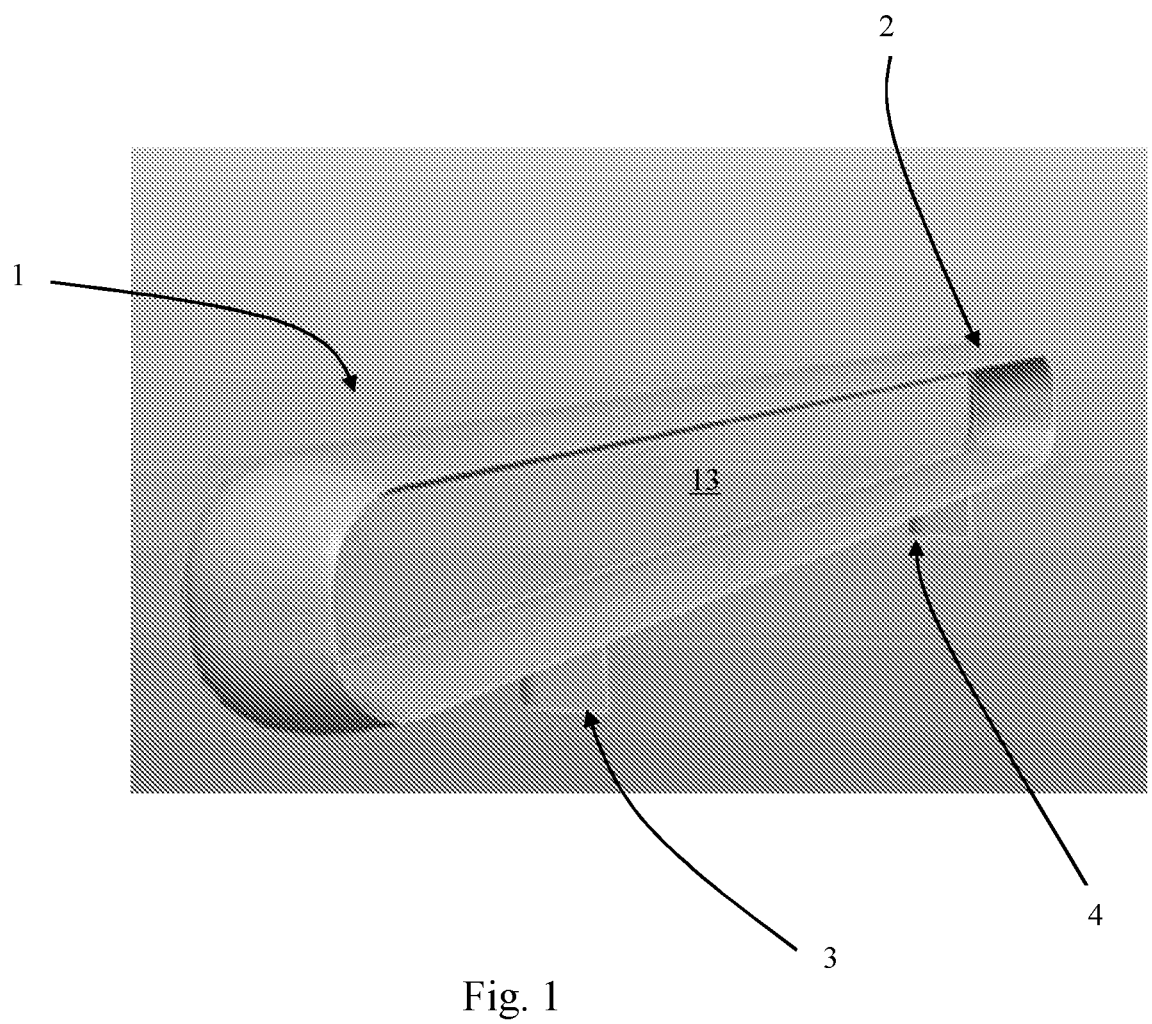
FIG. 1 is a perspective view of a flow device according to one embodiment of the invention.
Figure 2:
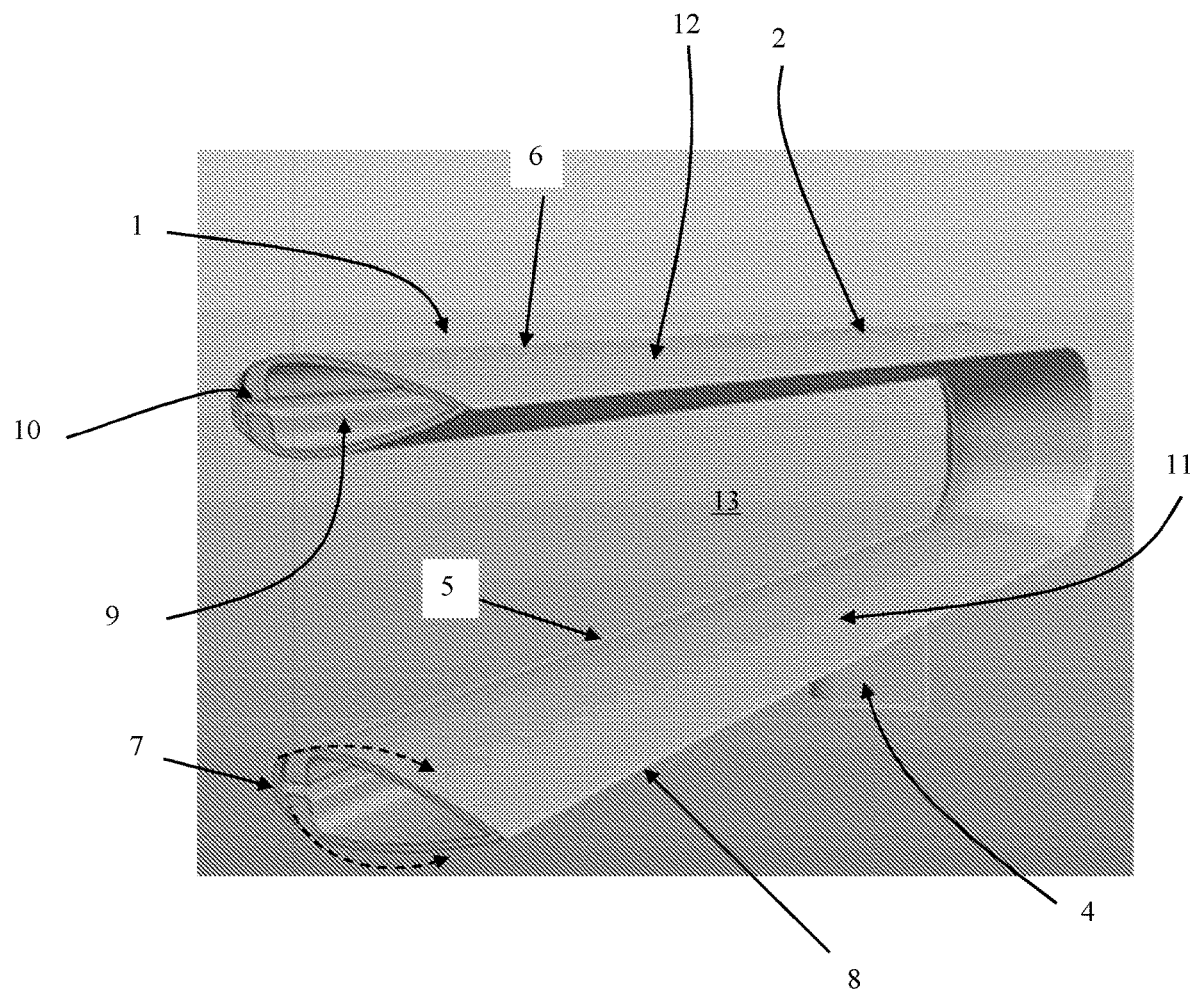
FIG. 2 is a perspective view of the flow device shown in FIG. 1 with a section cut away.

Referring to FIGS. 1 and 2, a flow device 1 for use in an additive manufacturing apparatus comprises a body 2 that defines an aperture/mouth 13 and legs 3, 4 for supporting the body 2. The aperture/mouth 13 defined by the body 2 has a substantially oval form with a length significantly greater than its width.

The body 2 comprises a plenum 9 connectable to a pressurised gas source (not shown), for example via a passageway through leg 3 or 4, the plenum 9 connected to openings 5, 6 in the body 2 via a T-shaped internal passageway 10. The confinement of the pressurised gas entering the passageway 10/openings 5, 6 from the plenum 9 generates a jet of gas at the openings 5, 6.

The body 2 has a tear-drop shaped cross-section tapering from a broad, upstream end 7 to a narrow, downstream end, in this embodiment, a point 8. The openings 5, 6 are located near the upstream end 7 of the body 2 to direct the jet of gas over an inwardly facing surface 11 and an outwardly facing surface 12 of the body 1, respectively. In this embodiment, the openings 5, 6 are substantially continuous slits running the full length of the loop defined by the body 2, with appropriate webs (not shown) holding the upstream end 7 of the body 2 in place.

Each surface 11, 12 turns away from a direction of the jet. The curvature of the surfaces 11, 12 and the direction of the jet relative to the surface 11, 12 is arranged such that, in use, each jet of gas is pulled towards the corresponding surface 11, 12 by virtue of the Coandă effect (as indicated by the dashed arrows), which in turn, draws additional surrounding gas into the spaces adjacent the surfaces 8, 9.

Figure 3:
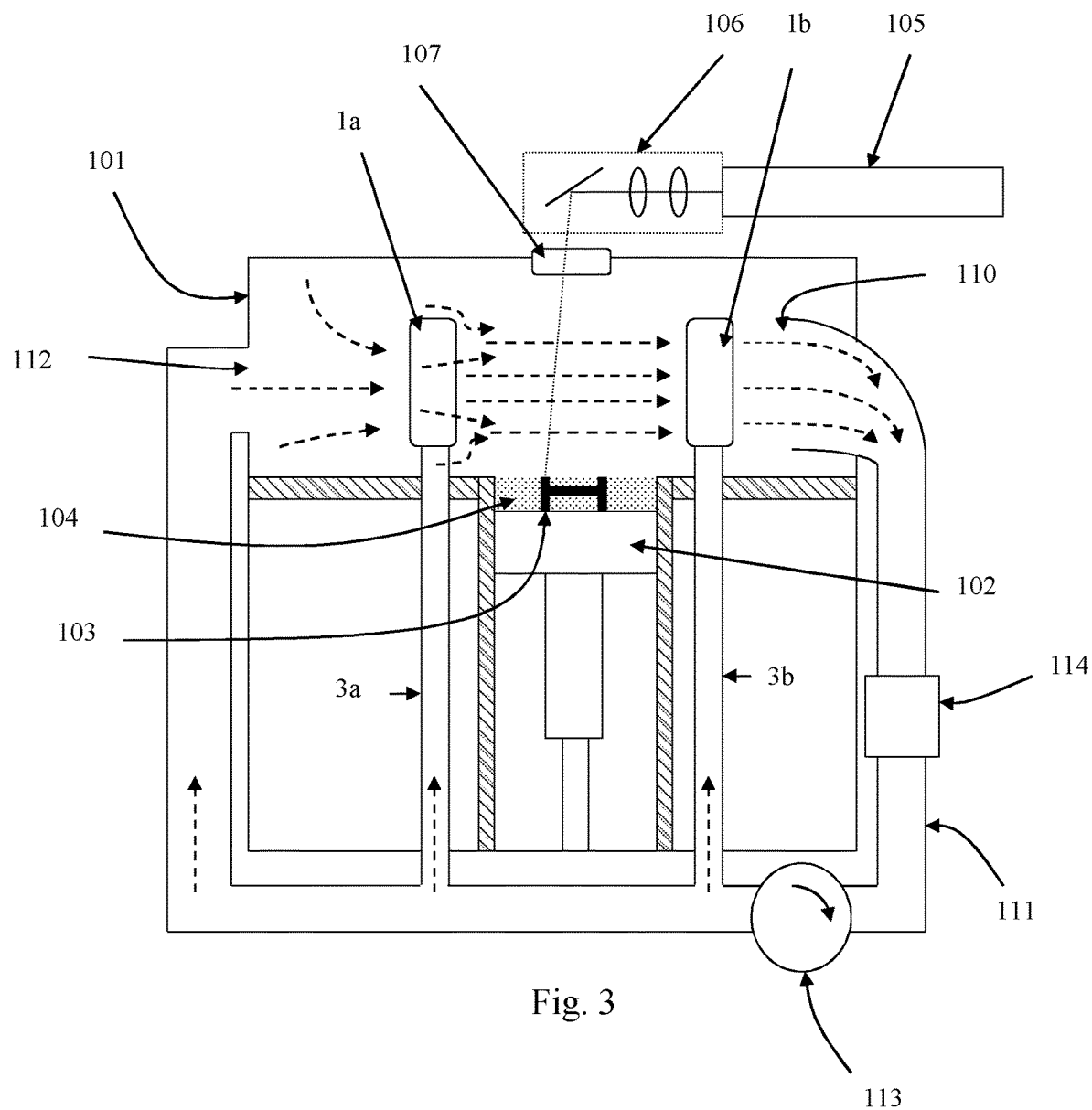
FIG. 3 is a schematic view of an additive manufacturing apparatus according to an embodiment of the invention from one side.
Figure 4:
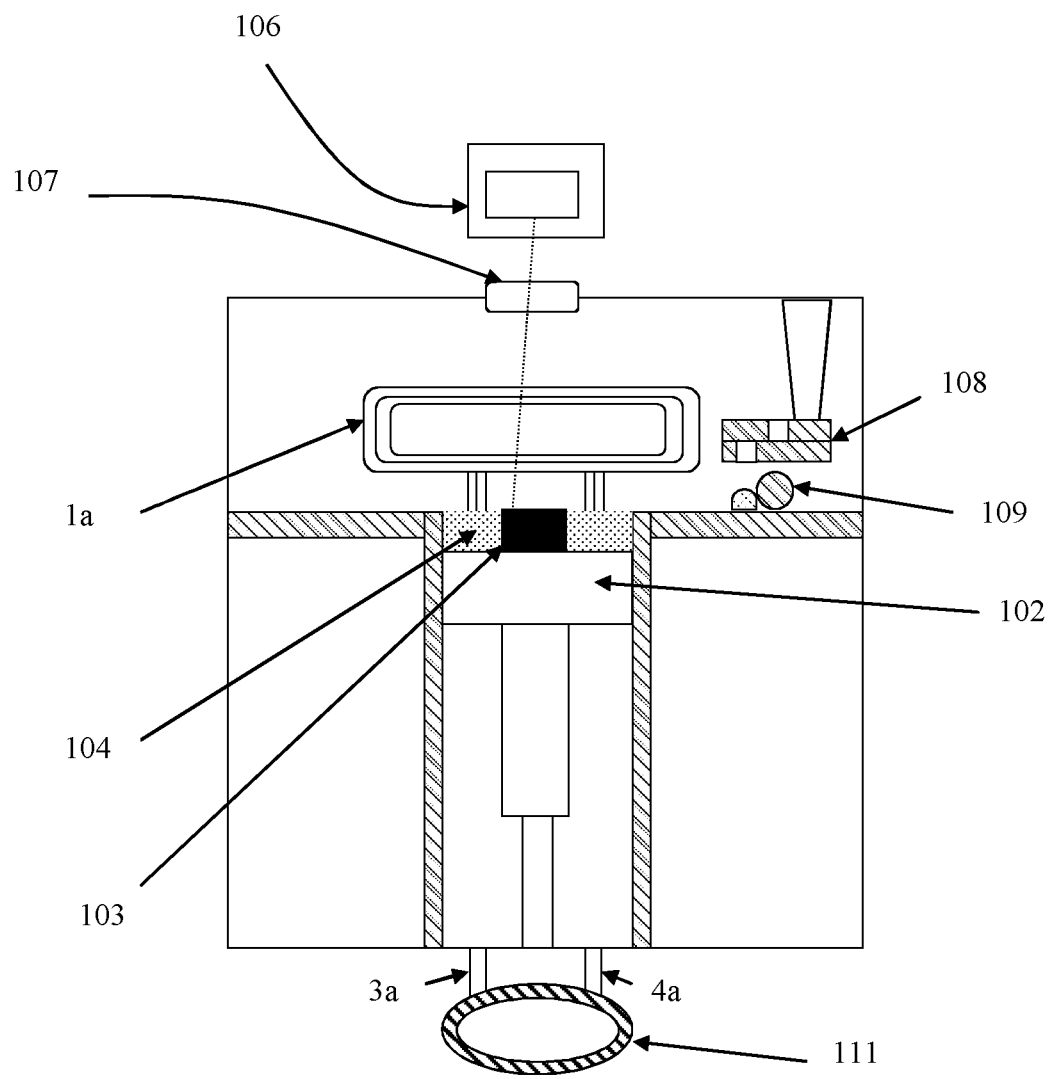
FIG. 4 is a schematic of the additive manufacturing apparatus shown in FIG. 3 from another side.

Referring to FIGS. 3 and 4, a pair of such manifolds 1a, 1b is positioned within a build chamber 101 of an additive manufacturing apparatus to generate a gas flow in the build chamber 101. The additive manufacturing apparatus comprises a build platform 102 for supporting an object 103 built by selective laser melting powder 104. The platform 102 can be lowered in the chamber 101 as successive layers of the object 103 are formed. Layers of powder 104 are formed as the object 103 is built by dispensing apparatus 108 and a wiper 109. For example, the dispensing apparatus 109 may be apparatus as described in WO2010/007396. A laser module 105 generates a laser for melting the powder 104, the laser directed as required by optical module 106. The laser enters the build chamber via a window 107.

The manifolds 1a, 1b are positioned either side of a volume above the build platform 102 with both sides of the aperture of each manifold 1a, 1b open to the build chamber 101. The manifolds 1a, 1b are located with the transverse diameter of the aperture located parallel with the build platform 102. In this way, manifold 1a draws gas, typically an inert gas, from the build chamber 101 and propels the gas into the volume above the build platform 102 and manifold 1b draws gas from the volume above the build platform 102 (as indicated by the arrows and dotted lines) to create a substantially planar (or blade-like) laminar flow over the build platform 102. The laminar flow may reduce variations in properties, such as porosity and compression strength, of an object/objects being built. As represented by the bolder dotted lines, flow from point 8 of the manifold 1a may be faster than the flow from the central opening. This sleeve of fast flowing gas may enhance entrapment and transport of condensate from the volume above the build platform 102.

An outlet 110 is arranged for capturing gas and condensate expelled by manifold 1b. Any gap between the outlet 110 and the manifold 1b is suitably small to reduce the chance that condensate will escape the outlet. In one embodiment (not shown), the outlet 110 and manifold 1b are physically joined. For example, rather than the outlet 110 comprising a flared body that extends into the build chamber 101, as shown in FIG. 3, the manifold 1b may be formed as part of the wall of the build chamber 101 having tapering surfaces 11 for generating the Coandă effect for sucking gas into the outlet.

Gas is re-circulated from the outlet 110 to inlet 112 and openings 5 and 6 in the manifolds 1a and 1b through a gas recirculation loop 111. A pump 113 maintains the desired gas pressure at inlet 112 and openings 5,6. Gas is delivered to openings 5 and 6 through legs 3a, 3b and 4a, 4b of the manifolds 1a, 1b. A filter 114 is provided in the recirculation loop 111 to filter from the gas condensate that has become entrapped in the flow. It will be understood that more than one inlet 112 may be provided in the build chamber 101. Furthermore, rather than extending outside of the build chamber 101, the recirculation loop 111 may be contained within the build chamber 101.

An object built using the additive manufacturing apparatus may comprise fewer defects because of the improvement in removing condensate from the volume around the object being built. In particular, the amount of condensate that settles on and is integrated into the object may be reduced.

The object may have lower porosity and/or higher compression strength because of the improved gas flow. There may be less variation in the porosity and/or compression strength of the object/objects.

The gas flow may also reduce/eliminate the settling of condensate on window 107. The settling of condensate on window 107 can affect the direction and focus of the laser, which may affect the accuracy of the build.

Figure 5:
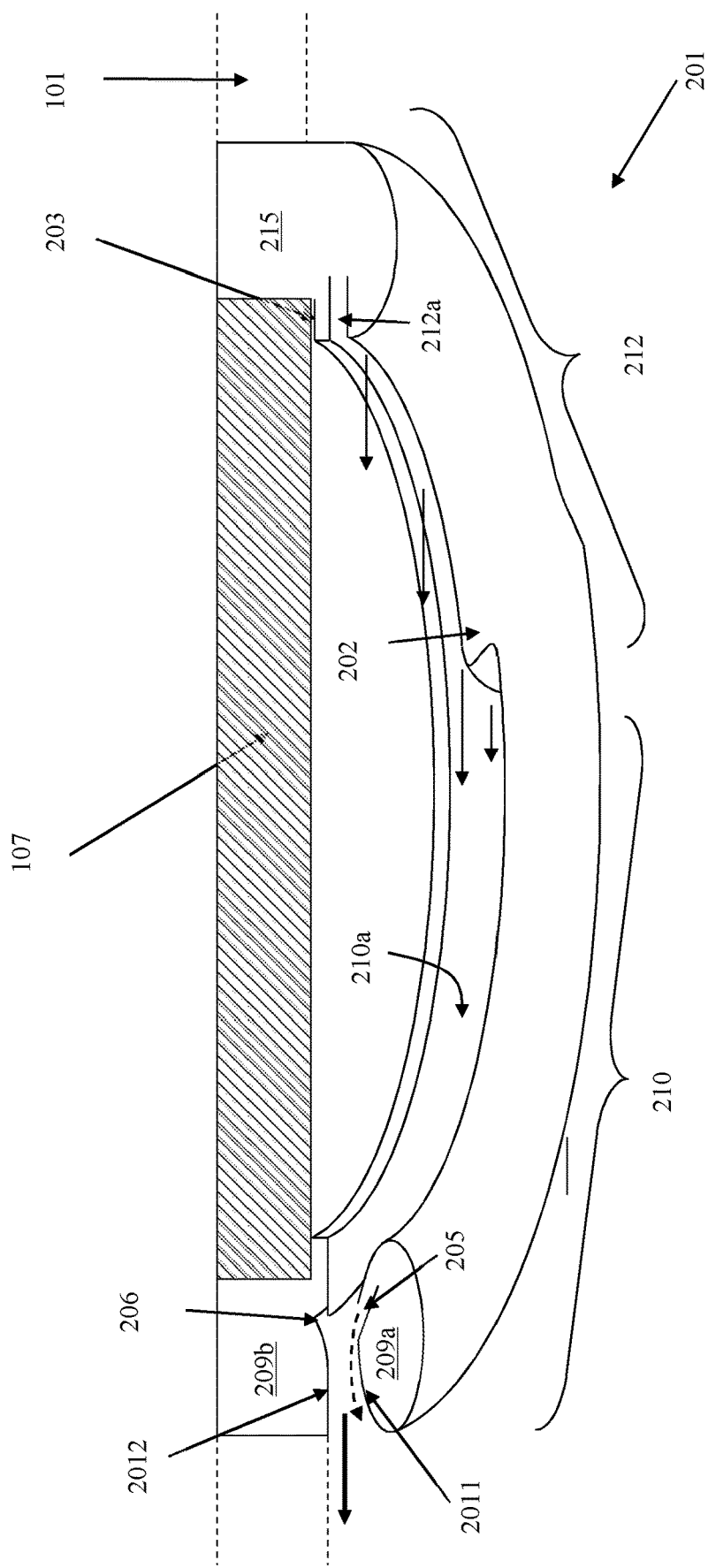
FIG. 5 is a perspective view of a flow device according to another embodiment of the invention for generating gas flow across a window in the build chamber.

FIG. 5 shows a dedicated gas flow device 201 for generating a gas flow across the window 107. Such a gas flow device 201 may be provided in conjunction with or independently from gas flow devices 1a and 1b. The gas flow device 201 comprises a hollow body 202 that provides an annular seat 203 for circular window 107. The flow device is fitted within an aperture in a wall of the build chamber 101 to provide optical access to the build chamber through the window 107.

The hollow body 202 comprises an arc shaped inlet portion 212, which provides an inlet 212a for propelling gas into a volume directly below the window 107, and an arc shaped outlet portion 210, which provides an outlet 210a for drawing gas from the volume directly below the window 107. Together the inlet and outlet portions 212, 210 encircle a space directly below the window 107.

The outlet portion 210 of the hollow body 202 defines two plenum chambers 209a and 209b and the inlet portion 212 defines a single plenum chamber 215. The chambers 209a, 209b and 215 are connectable to a source of pressurised gas (not shown). The chambers 209a, 209b and 215 may be connected together and therefore, pressurised by the same gas source. Gas from chamber 215 can flow out of inlet 212a across a lower surface of window 107 (as indicated by the arrows). An arc of the inlet 212a is sufficient to provide gas flow across the entire width of the window 107.

Outlet portion 210 comprises openings 205 and 206 arranged such that the confinement of pressurised gas entering the openings 205, 206 from the chambers 209a and 209b, respectively, generate a jet of gas over outer surfaces 2011, 2012. The openings 205, 206 are arc shaped slits running around outlet portion 210.

At least surface 2011 provides a Coandă surface that curves away from a direction of the jet provided by outlet 205. The curvature of surface 2011 is arranged relative to the direction of jet formed by opening 205 such that the jet is pulled towards the surface 2011 by virtue of the Coandă effect (as indicated by the dashed arrow), creating a low pressure which draws gas into outlet 210a from the space below of the window 107. In this way, the gas propelled from inlet 212a and the gas drawn into outlet 210a forms gas flow across a lower surface of the window 107. Such a gas flow may help to prevent condensate generated during the additive manufacturing process from settling on window 107.

Figure 6:
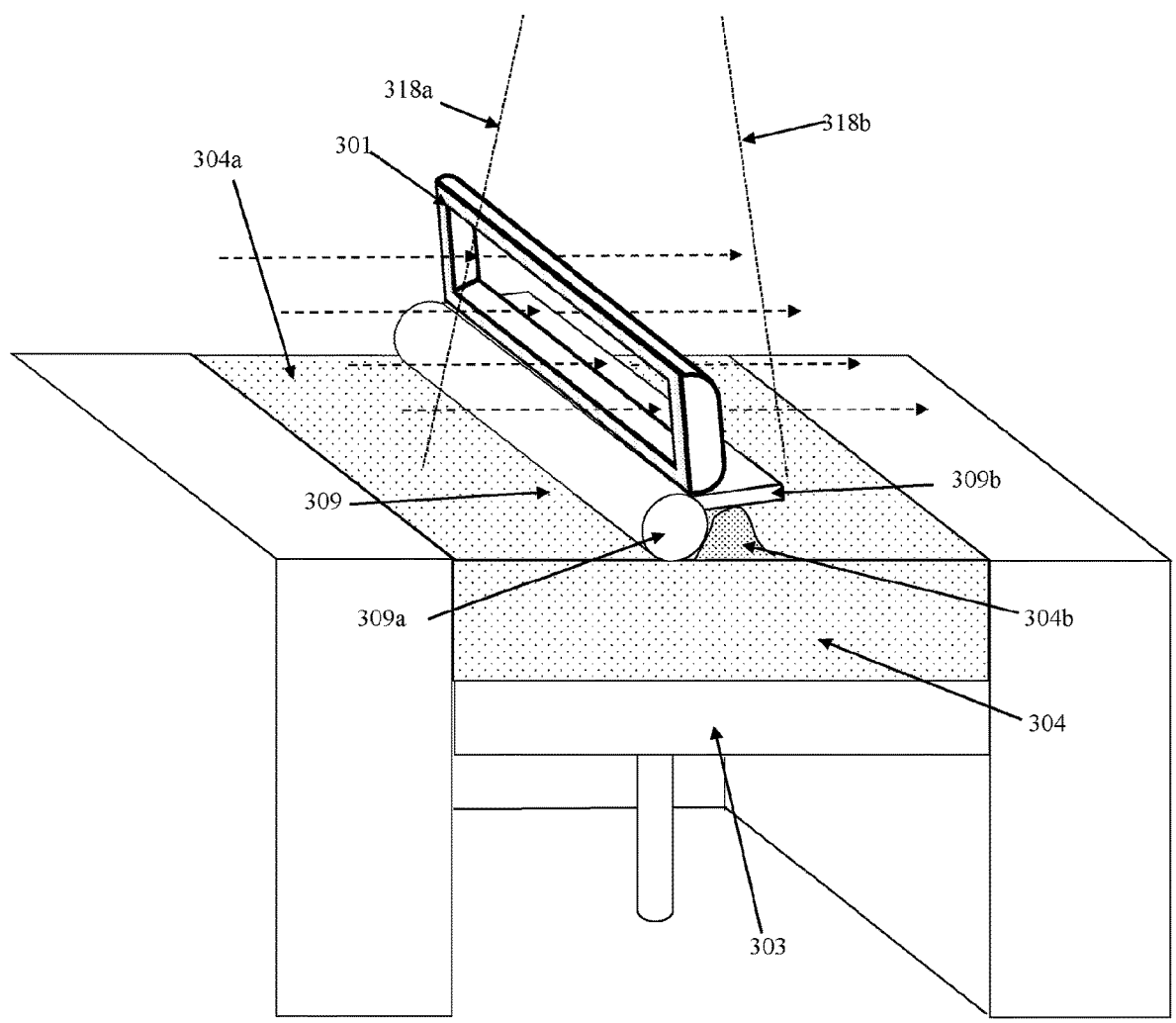
FIG. 6 is a perspective view of a gas flow device according to another embodiment of the invention mounted to be movable with the wiper.

FIG. 6 shows a further embodiment of the invention. Features of this embodiment that corresponding to feature of the embodiment shown in FIGS. 3 and 4 have been given the same reference numerals but in the series 300.

An inlet and outlet (not shown) in the build chamber are connected to a gas recirculation loop to generate a gas flow across working surface 304a of powder bed 304.

The gas flow device 301 of this embodiment is like that shown in FIGS. 1 and 2 but mounted on the wiper 309. In this embodiment, the wiper 309 comprises a cylindrical element 309a for contacting the powder and a cowl 309b for protecting the powder heap 304b in front of the wiper 309 from the gas flow. The gas flow device 301 draws gas in from one side of the wiper 309 and propels gas out to the other side of the wiper 309. As a result, the gas flow device 301 influences the gas flow that traverses across the wiper (from one side of the wiper 309 to the other side of the wiper 309) such that a laminar gas flow is maintained even with the wiper 309 present within the gas flow. In this way, debris generated during consolidation of the powder with the laser beam(s) 318a, 318b is carried away to the gas outlet as desired.

A single laser beam 318a, 318b or multiple laser beams 318a, 318b may be scanned across the powder bed 304 both sides of the wiper 309 during spreading of a powder layer with the wiper 309. Alternatively, each laser beam 318a, 318b may scan on a dedicated side of the wiper 309.

Figure 7:
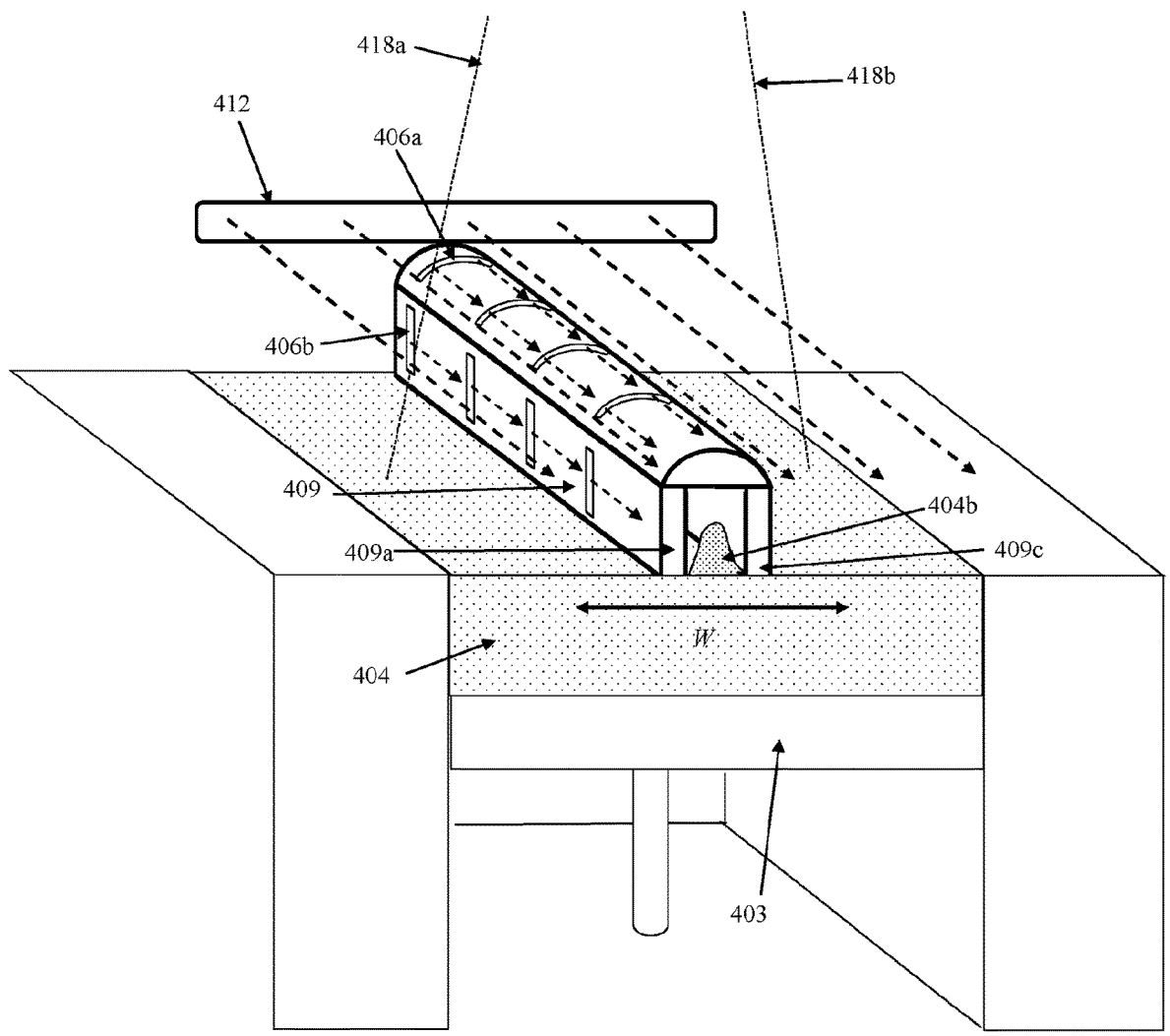
FIG. 7 is a perspective view of a gas flow device according to yet another embodiment of the invention mounted to be movable with the wiper.
Figure 8:
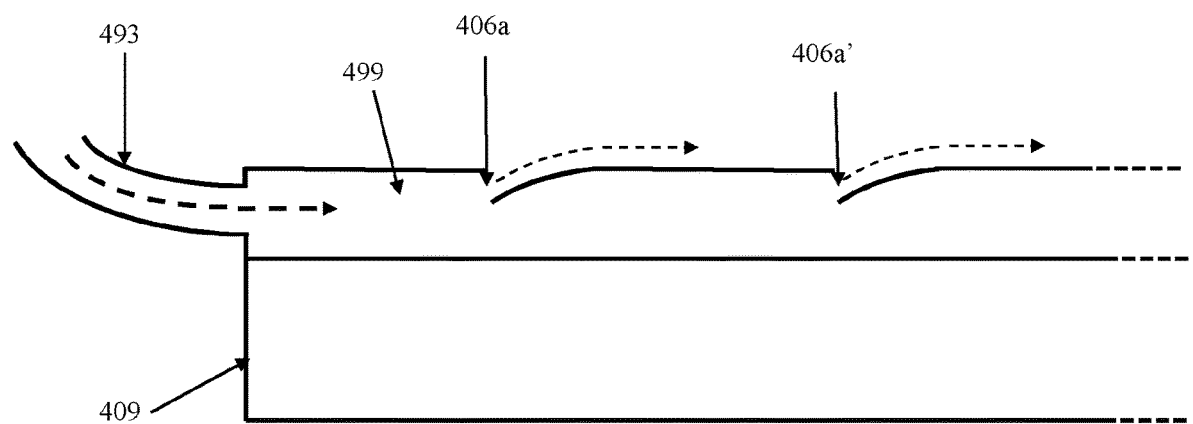
FIG. 8 is a cross-sectional view of the gas flow device shown in FIG. 7.

FIGS. 7 and 8 show a further embodiment of the invention. Features of this embodiment that corresponding to feature of the embodiments shown in FIGS. 3, 4 and 6 have been given the same reference numerals but in the series 400. This embodiment differs from the embodiment shown in FIG. 6 in that the gas flow across the working surface 404a is generated to be perpendicular to directions, W, in which the wiper is moved to spread a powder layer.

In this embodiment, the wiper 309 comprises a U-shaped housing including a pair of wiper blades 409a, 409c. Wiper blade 409a is for spreading powder during movement of the wiper 409 in one of the directions, W, and wiper blade 409c is for spreading powder during movement of the wiper 409 in the other opposed direction, W. It will be understood that the wiper housing may have a different shape and the wiper 409 may comprise only a single wiper blade 409a, 409c.

The wiper housing defines a plenum chamber 499 connected to a source of pressurised gas via a flexible conduit 493. A series of openings 406a, 406b, in this embodiment, slots, spaced apart at locations along a length of the housing direct jets of pressurised gas parallel to a surface of the housing in a direction parallel with the gas flow generated between inlet 412 and an outlet (not shown) in the build chamber. The high velocity jets of gas directed along outer surfaces of the wiper 409 influence the gas flow that traverses the wiper 409 such that a substantially laminar gas flow is maintained in the vicinity of the wiper 409. Accordingly, interruption/turbulence caused by the presence of the wiper in the gas flow between the inlet and outlet is reduced. In this way, debris generated during consolidation of powder with the laser beams 418a, 418b during spreading of powder with the wiper 409 is carried away as desired by the gas flow.

It will be understood that modifications and alterations can be made to the above described embodiments without departing from the scope of the invention as described herein. For example, the embodiment shown in FIGS. 7 and 8 may be modified to provide a gas flow device on the wiper 409 having a Coandă surface arranged for generating laminar gas flow in a direction perpendicular to the directions, W, in which the wiper moves to spread powder. Two Coandă flow devices, each similar to the flow device shown in FIGS. 1 and 2, may be mounted at either end of the wiper to generate a laminar gas flow along a longitudinal extent of the wiper.

The invention claimed is:

1. Additive manufacturing apparatus for manufacturing a three-dimensional object by layerwise consolidation of flowable material, the apparatus comprising a lowerable build platform for supporting a bed of the flowable material, an energy beam for selectively consolidating flowable material at a working surface of the bed to form the object, a wiper for spreading flowable material across the bed, the wiper movable during consolidation of the flowable material with the energy beam, and an active flow device for influencing a gas flow that traverses the wiper, the active flow device movable with the wiper.

2. Additive manufacturing apparatus according to claim 1, comprising a gas inlet and gas outlet in the build chamber for generating a gas flow across the working surface, the gas flow traversing the wiper as the wiper moves to spread powder during consolidation of the flowable material, the active flow device influencing the gas flow in the vicinity of the wiper.

3. Additive manufacturing apparatus according to claim 1, wherein the active gas flow device comprises at least one opening therein for sucking gas from the build chamber.

4. Additive manufacturing apparatus according to claim 1, wherein the active gas flow device comprises at least one opening therein for propelling gas into the build chamber.

5. Additive manufacturing apparatus according to claim 4, wherein the opening generates a jet of gas along a surface of the active flow device.

6. Additive manufacturing apparatus according to claim 5, wherein the surface is a Coandă surface.

7. Additive manufacturing apparatus according to claim 5, wherein the surface is a surface that extends parallel to a direction of the jet.

\* \* \* \* \*